United States Patent

Brindley et al.

[15] 3,653,257
[45] Apr. 4, 1972

[54] DUAL TORQUE INDICATOR

[72] Inventors: Hanby S. Brindley, Arlington; John A. Buyers, Jr., Fort Worth; Turpin Gerard, Euless; John S. McClung, Jr., Hurst, all of Tex.

[73] Assignee: Textron-Inc., Fort Worth, Tex.

[22] Filed: Dec. 4, 1969

[21] Appl. No.: 882,260

[52] U.S. Cl. ............................ 73/138, 73/432 A, 116/129 R
[51] Int. Cl. ................................................................ G01l 5/00
[58] Field of Search .................... 73/136 R, 137, 138, 432 R; 116/129; 235/119, 120

[56] References Cited

UNITED STATES PATENTS

| 2,538,843 | 1/1951 | McGuire | 73/432 A UX |
| 3,091,214 | 5/1963 | Hoffman | 116/129 |
| 3,135,119 | 6/1964 | Hauptman | 73/510 |
| 3,483,758 | 12/1969 | Munden | 73/510 X |

OTHER PUBLICATIONS

" Aircraft Pressure and Load Systems" Fairchild Control Bulletin, Oct. 16, 1964

*Primary Examiner*—Charles A. Ruehl
*Attorney*—Richards, Harris & Hubbard and George Galerstein

[57] ABSTRACT

A meter for indicating two related functions together with the summation of the values of the two functions by means of a pair of coaxially, separately driven pointers cooperating with a scale on a fare plate behind the needles and a function summation unit driving a pointer behind the fare plate and extending at least in part in front of the fare plate in cooperation with a second scale thereon.

8 Claims, 4 Drawing Figures

PATENTED APR 4 1972

3,653,257

INVENTORS:
HANBY S. BRINDLEY
JOHN A. BUYERS, JR.
TURPIN GERARD
JOHN S. McCLUNG, JR.

*Richards, Harris & Hubbard*
ATTORNEYS 3,653,257

DUAL TORQUE INDICATOR

This invention relates to instruments for use in an aircraft and more particularly to an instrument to display two related functions and the summation thereof.

BACKGROUND OF THE INVENTION

Heretofore aircraft torque indicators have separately indicated the torque from the aircraft engine or engines. Recent advances in the design of helicopters have brought about the extensive use of dual engine aircraft. With such aircraft the pilot needs to know the combined torque output of the two engines as well as the torque output of each individual engine. For ease of use by pilots, a torque indicator should provide a display which is uncluttered and is easy to read. Other related functions are also to be displayed such as fuel flow, fuel quantity, etc.

The present invention provides an instrument which continuously displays the magnitude of two related functions together with the value of the sum of the functions in a presentation which is uncluttered and easily read.

SUMMARY

In accordance with the present invention an indicator is provided to display a pair of variable functions and the sum thereof. The indicator includes a meter scale plate having a pair of graduated arcuate scales symmetrical about an axis. A pair of pointers coaxially are mounted for independent rotation about the axis in front of the plate. Driving means drive the pointers, one in accordance with each of the two functions. The indicator also includes means for summing the two functions. A pointer supported for rotation behind the plate extends at least in part in front of the scale plate and moves in accordance with the sum of the two functions in cooperation with a second arcuate scale on the scale plate to indicate the summation value.

THE DRAWINGS

For a more complete understanding of the invention and for further advantages thereof, reference may now be had to the following description taken with the accompanying drawings in which.

DESCRIPTION OF A PREFERRED EMBODIMENT

FIGURE 1

Figure 1:
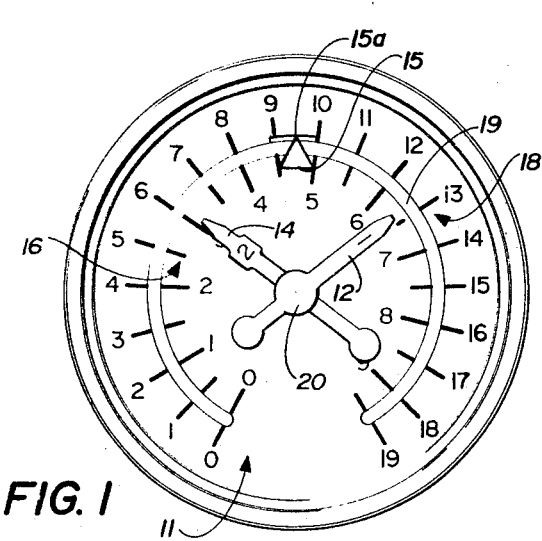
FIG. 1 is an illustration of the face of a torque indicator.

FIG. 1 shows the face of a dual torque indicator as employed to indicate the torque of dual engines on a helicopter. The indicator is a panel mounted instrument which includes a meter scale plate 11, a first pointer 12, a second pointer 14, and a rotating cursor 15. The meter scale plate 11 contains a graduated arcuate inner scale 16, and a graduated arcuate outer scale 18. An arcuate slot 19 in the meter scale plate 11 separates inner scale 16 from outer scale 18. Pointer 12 rotates about axis 20 near the center of the meter scale plate 11. Pointer 12 cooperates with inner scale 16 to to indicate functional values from one engine. The second pointer 14 is shaped distinctively from the first pointer 12 so that each pointer can be easily identified. The second pointer 14 also rotates about axis 20 and cooperates with the inner scale 16 to indicate like functional values from a second engine. The rotating cursor 15 moves within slot 19 and by means of the cursor pointer 15a cooperates with the outer scale 18 to indicate the sum of the values shown by the first pointer 12 and the second pointer 14.

FIGURE 2

Figure 2:
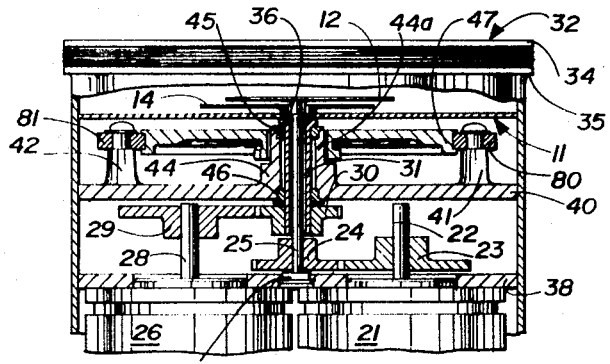
FIG. 2 is a bottom view of the indicator partially sectioned along line 2—2 of FIG. 4.

FIG. 2 is a partially sectioned bottom view of the front portion of the indicator. A first torquer motor 21 drives a shaft 22 and a first drive gear 23. Gear 23 engages a first transmission gear 24 which is integrally fastened to a shaft 25 on which pointer 12 is mounted so as to rotate with shaft 25.

A second motor 26 has a shaft 28 on which a second drive gear 29 is mounted. Gear 29 drives a second transmission gear 30 which is rigidly attached to a concentric tubular axial shaft 31. Pointer 14 is mounted on shaft 31. Shaft 31 is separated from shaft 25 by means of a slip ring 36.

The end of the instrument case 32 which houses the dual torque indicator is shown unsectioned in FIG. 2. The forward end 34 of the instrument case 32 has a rib of greater diameter than the remainder of the case to provide a stop 35 for mounting the case in an opening in an aircraft instrument panel.

Figure 3:
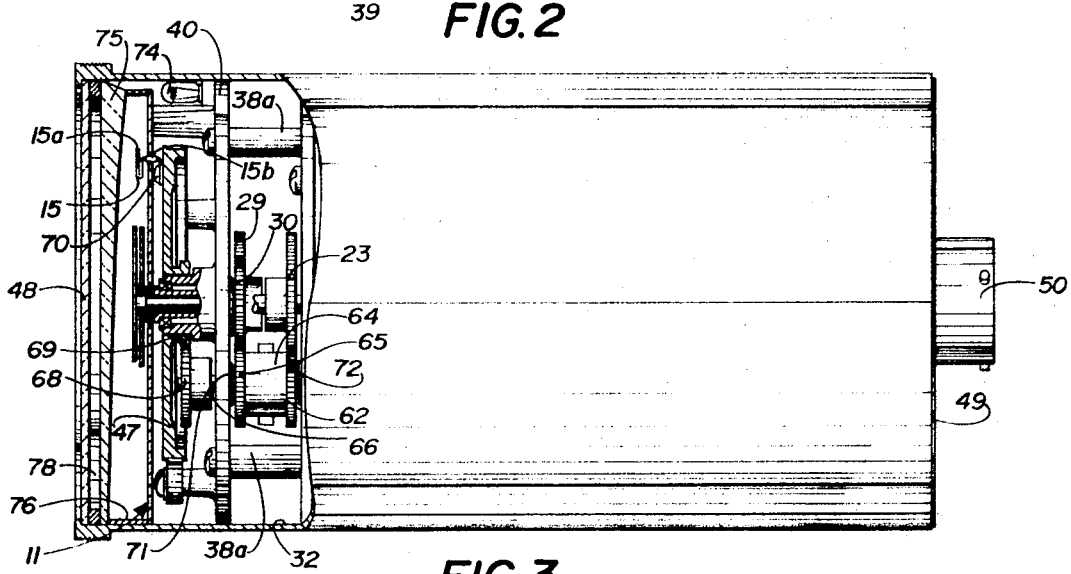
FIG. 3 is a partially sectioned schematic elevation of the interior of the indicator.

The meter scale plate 11 as shown in FIG. 2 is located immediately behind the pointers 12 and 14. A first mounting plate 38 is positioned within the housing immediately in front of motors 21 and 26. Motors 21 and 26 are mounted on plate 38. Instrument ball bearings 39 are also secured in plate 38 to provide bearings for shaft 25. A second mounting plate 40 is located forward of gear 29 and is secured to plate 38 by spacers 38a (FIG. 3). Plate 40 supports guideposts 41 and 42 and forms a cylindrical shaft housing 44.

Bearings 45 and 46 are fastened to the interior cylindrical opening in the housing 44 and provide bearing surfaces for the concentric shaft 31. Housing 44 has a reduced outside diameter toward its forward end forming an axial mounting 44a upon which the cursor carrier wheel 47 is mounted. Ball bearing topping hobs 80 and 81 are mounted on posts 41 and 42 and fit into a groove on the outer rim of the cursor carrier wheel 47 to permit rotational movement of the wheel while preventing wobble or other undesirable motion by the wheel.

FIGURE 3

FIG. 3 is a partially sectioned elevation view of the indicator. The indicator is encased in a compartment formed by case 32, which is closed by front window 48. An electrical receptacle 50 is mounted on and extends from the back side of rear plate 49 to permit connection to outside electrical circuits (not shown).

Suitable electronics convert input signals received from engines into DC electric currents to control movement of the torquer motors 21 and 26 (see FIG. 2) to drive gears 23 and 29. Gear 23 enmeshes gear 24 (see FIG. 2) which in turn enmeshes and drives the first input differential gear 62 of the differential 64.

Gear 29 enmeshes gear 30 which in turn drives the second input differential gear 65. The differential 64 produces a rotation of shaft 66 which is equal to the average of the rotation supplied to the differential 64 by gears 62 and 65. The gear 68 is mounted on shaft 66 so that motion of the shaft 66 is directly transmitted to gear 68 which is enmeshed with gear 69. Gear 69 is an integral part of the cursor carrier wheel 47. Cursor 15 is attached to wheel 47 by means of screw 70. Cursor 15 consists of a pointer 15a which cooperates with the outer scale 18 (see FIG. 1) on plate 11 and is located forward of plate 11. It also includes a connecting member 15b which is joined to pointer 15a and is secured to wheel 47 by means of screw 70 and passes through slot 19 in plate 11 (see FIG. 1). Bearings 71 and 72 support the differential output shaft 66.

A lamp assembly 74 is attached to plate 40 and cooperates with collar 76 to secure a lighting prism 75 against ring 78 which in turn is secured against window 48. Lamp 74 and prism 75 provide illumination of the meter scale plate 11 and the pointers which cooperate therewith.

FIGURE 4

Figure 4:
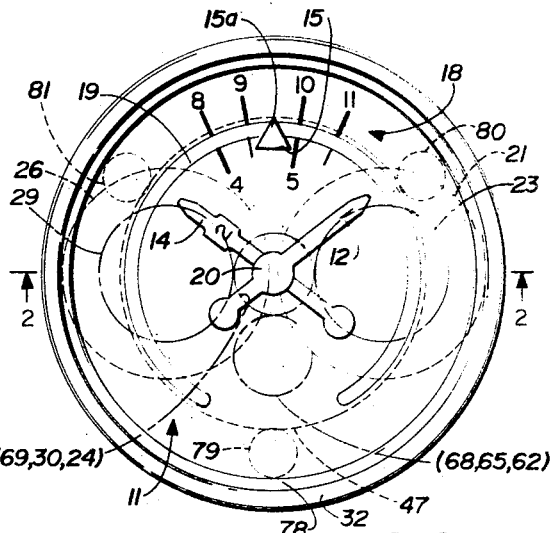
FIG. 4 is a diagrammatic representation which shows the relative locations of the principal elements of the indicator assembly.

FIG. 4 is a diagrammatic representation which shows the relative locations of the principal elements of the indicator.

The instrument case 32 surrounds the entire indicator. The separator ring 78 separates the window 48 (FIG. 3) from the lighting prism 75. Ring 78 lies immediately within the inner edge of case 32. Centered on a circle of slightly smaller diameter than than of the inner edge of ring 78 are three ball bearings 79, 80 and 81 which engage the outer edge of wheel 47. The slot 19 in plate 11 has an outside diameter which is slightly smaller than that of wheel 47. Cursor 15 is driven by wheel 47 along the slot 19 and has a pointer 15a which cooperates with the outer scale 18.

A first set of gears which includes gears 69, 30 and 24, and a second set which includes gears 68, 65 and 62, have equal diameters. In FIG. 4, gears 68, 65, 62 are indicated by a single circle to show the diameter and the location relative to the axis 20 of three gears. The forwardmost gear is gear 68. Positioned rearward of gear 68 are gear 65 and gear 62.

As shown in FIG. 4, motor 21 is connected through shaft 22, FIG. 2, to gear 23 which is enmeshed with gear 24 which in turn is connected through shaft 25 (FIG. 2) to pointer 12. Gear 24 is also enmeshed with gear 62 for rotation of differential 64, FIG. 3.

In a similar manner motor 26 is connected through shaft 28, FIG. 2, to gear 29 which is enmeshed with gear 30 which in turn is connected through shaft 31, FIG. 2, to pointer 14. Gear 30 is also enmeshed with gear 65 for rotation of differential 64, FIG. 3, which is connected to shaft 66, FIG. 3, which is rigidly connected to gear 68. Gear 68 is enmeshed with gear 69 which is an integral part of wheel 47 to which the rotating cursor 15 is attached through slot 19 in plate 11 to enable pointer 15a to cooperate with outer scale 18 of the meter scale plate 11.

In operation, as shown in FIGS. 2 and 3, rotational motion of motor 21 is transmitted directly to gear 23 by way of shaft 22. Gear 23 is enmeshed with gear 24 so that the motion is transmitted to gear 24 which in turn rotates pointer 12 through shaft 25.

Rotational motion imparted to gear 24 is also conveyed to the gear 62.

In a similar manner, rotational motion provided by the torque motor 26 is transmitted by way of shaft 28 to drive gear 29 so that the motion is conveyed to gear 30 which in turn rotates pointer 14 through shaft 31.

Rotational motion of gear 30 is also transmitted to differential gear 65. Rotational movements of gears 62 and 65 are averaged by the differential 64 which imparts the average motion to shaft 66 which extends the motion to pinion gear 68. Gear 68 drives gear 69 thereby moving the cursor carrier wheel 47. The cursor 15 is affixed to wheel 47 so that its angular motion always corresponds to that of the differential 64 and therefore represents an average of the movements indicated by the first pointer 12 and the second pointer 14. Thus, pointer 15a will always be positioned at a point which is half between the angular positions of pointer 12 and pointer 14.

As shown in FIG. 1, the outer scale 18 of the meter scale plate 11 has graduations which are twice those of the values for similar angular position of the inner scale 16. With this relationship between the inner scale 16 and the outer scale 18, the pointer 15a cooperates with the outer scale 18 to indicate the value of the sum of values designated on scale 16 by pointers 12 and 14 since the sum of the values indicated by the first and second pointers 12 and 14 is equal to twice the average of those values as represented by the angular position of the rotating cursor 15.

Thus, it may be seen that the preferred embodiment satisfies the objectives of this invention since it provides a continuous indication of the torque output or other function of each of two engines and the summation of the values from the two engines. The values from each of two engines are displayed by the indicator with a two pointer presentation which is easy to read and understand. The summation of the engine values is displayed by a cursor pointer which appears to form an extension of the two pointers when both engines are producing the same value function thus essentially providing a single needle appearance. When both engines are not producing equivalent value functions, the method of driving the cursor through a slot from behind the dial allows it to be read against the dial as a single pointer or portion of a needle without the associated problems and cluttered appearance of a typical three needle or pointer presentation.

As shown above, in the preferred embodiment dual torque or other engine functions are displayed. The display comprises a meter scale plate having a pair of graduated scales symmetrical about an axis, a pair of pointers coaxially mounted for rotation about the axis with means for driving one of the pointers in accordance with a function of the first of two engines and means for driving the second pointer in accordance with a like function of the second engine. The pointers cooperate with one of the graduated scales indicating the values of the functions of the engines. The indicator also comprises means for summing the functions provided by the two engines and a pointer supported for rotation behind the meter scale plate and extending through a circular slot in the scale plate for cooperation with the second or outer scale to indicate the summation of the function values from the engines. It will be appreciated that torque, fuel supply, fuel flow and other related functions may similarly be displayed.

The invention has been described in connection with the foregoing embodiment thereof. It is to be understood that the display may be mechanized in several ways, both electrically and mechanically and that further modifications may now suggest themselves to those skilled in the art. It is intended to cover such modifications as fall within the scope of the appended claims.

What is claimed is:

1. A meter which comprises:
   a. a scale plate having a pair of arcuate scales radially spaced from each other and spanned from an axis and having an arcuate slot therethrough between said scales,
   b. first and second pointers mounted coaxially for independent rotation in front of said plate,
   c. a third pointer mounted for rotation on said axis behind said plate and having a pointer tip extending through said slot cooperating with the second of said scales, and
   d. drive means for causing one of said pointers to move in predetermined relation to movement of the other two pointers.

2. The combination set forth in claim 1 wherein said drive means comprises separate drive means which cause independent rotation of said two pointers and a differential coupled to said separate drive means to drive said third pointer in dependence upon the sum of the motion of said two pointers.

3. The combination set forth in claim 1 wherein
   a. one of said first and second pointers and a central shaft form a first rotating assembly;
   b. a second of said first and second pointers and a hollow shaft emcompassing said central shaft form a second rotating assembly;
   (c) a rotatable member and said third of said pointers supported on said hollow shaft form a third rotating assembly; and
   d. wherein said drive means comprises a differential driven by two of said rotating assemblies which drives the third of said rotating assemblies.

4. The combination set forth in claim 3 wherein said rotatable member is a disk and means are provided to engage the rim of said disk to stabilize said third of said pointers.

5. The combination set forth in claim 4 wherein said means to engage the rim of said disk include roller means.

6. The combination set forth in claim 4 wherein the rim of said disk is grooved and roller means in said groove engage said disk to stabilize said disk.

7. A dual torque indicator which comprises:
   a. a meter scale plate having a pair of graduated scales thereon symmetrical about an axis,
   b. a pair of pointers coaxially mounted for rotation about said axis, c. means for driving one of said pointers in accordance with a function of the first of two engines and means for driving the other pointer in accordance with a like function of the second engine, said pointers cooperating with one of said scales, d. means for summing said functions, and e. an indicator supported for rotation behind said plate including a third pointer extending through a circular slot in said plate for cooperation with the second of said scales to indicate the said summation function.

8. The combination set forth in claim 7 wherein said pair of pointers terminate at a radius from said axis substantially the same as the inner radial margin termination of said third pointer whereby appearance of a single pointer is effected when said pointers are radially aligned.

* * * * *